United States Patent

[11] 3,623,449

[72] Inventor Robert C. Knutson
  Rosemount, Minn.
[21] Appl. No. 850,544
[22] Filed Aug. 15, 1969
[45] Patented Nov. 30, 1971
[73] Assignee Vexiler, Inc.
  Minneapolis, Minn.

[54] IMPACT ACCELERATION INDICATOR
  7 Claims, 7 Drawing Figs.
[52] U.S. Cl. ................................................ 116/114AH,
  73/492, 200/61.53
[51] Int. Cl. .................................................. G01p15/04,
  G01h 35/14
[50] Field of Search ............................................ 73/492;
  116/114.29; 200/61.53

[56] References Cited
  UNITED STATES PATENTS
2,671,832  3/1954  Hansard et al. ............... 200/61.53
2,742,542  4/1956  Bennett ........................ 200/61.53
2,885,505  5/1959  Mathisen ...................... 200/61.53
3,020,875  2/1962  Browning ..................... 116/114
3,145,571  8/1964  Maynard et al. ............... 116/114
3,318,157  5/1967  Browning et al. .............. 116/114

Primary Examiner—Richard C. Queisser
Assistant Examiner—Herbert Goldstein
Attorney—Dugger, Peterson, Johnson & Westman ABSTRACT: A recording instrument which will produce a visual or electrical signal indicating when a preselected acceleration level has been experienced by the instrument, and will permanently record such impact so that when the instrument is attached to a package, a visual examination of the instrument will indicate whether or not the package has been dropped or subjected to a damaging impact.

PATENTED NOV 30 1971

INVENTOR.
ROBERT C. KNUTSON
BY
Dugger, Peterson, Johnson & Westra

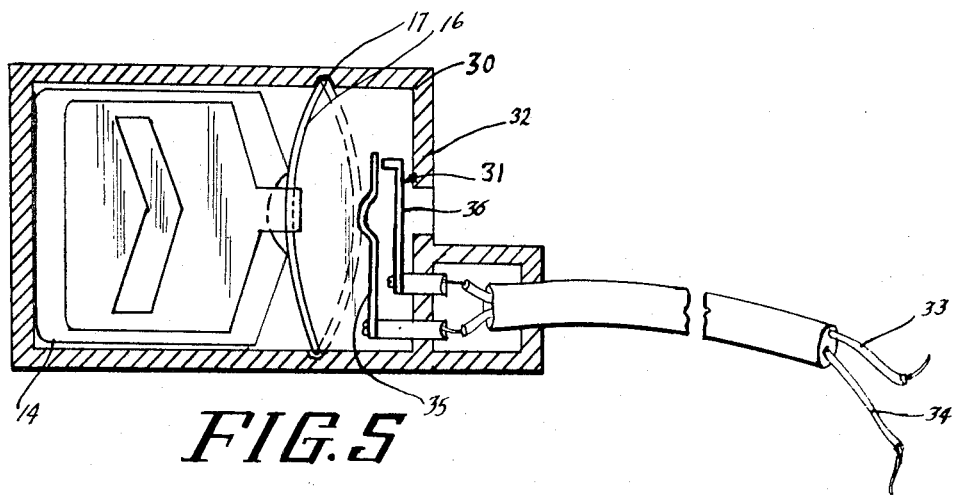
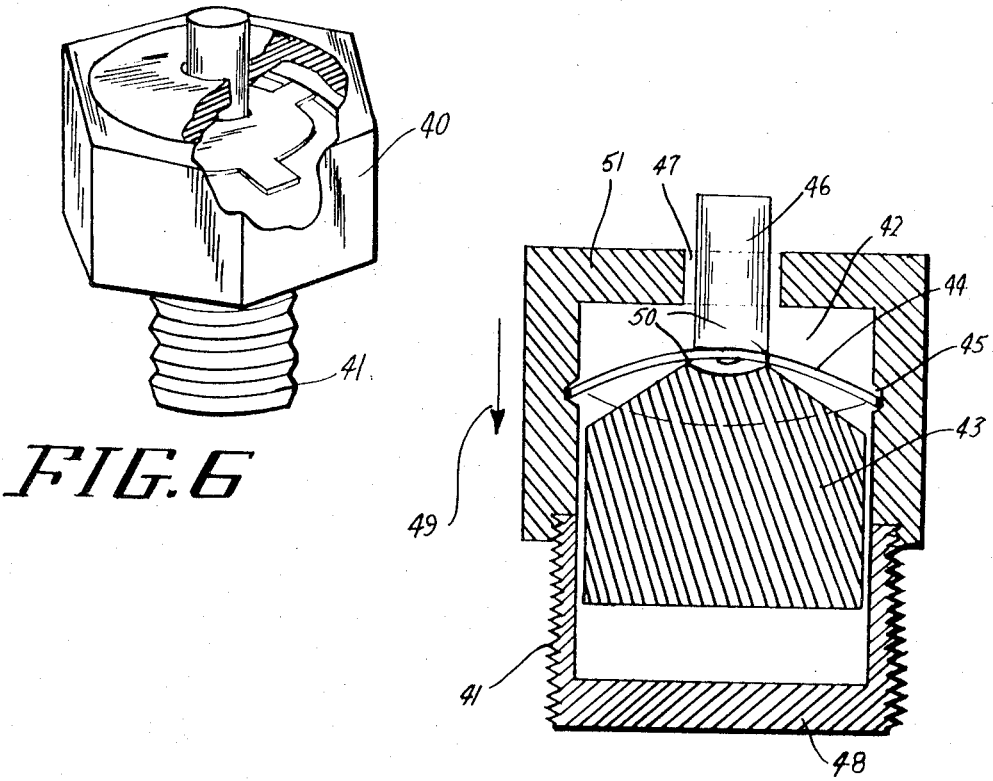

3,623,449

IMPACT ACCELERATION INDICATOR

BACKGROUND OF THE INVENTION

1. Field of the Invention

The present invention has relation to impact acceleration indicators.

2. Prior Art

Various types of impact indicators have been advanced. For example, U.S. Pat. No. 2,825,297 shows a device that utilizes two weights at opposite ends with a helical spring in between. When subjected to an impact, the weights will move against the helical spring and then are locked in place if a certain force is exceeded. Also, U.S. Pat. No. 3,071,973 shows belleville-type spring washers which act against a weight, and when the weight overcomes the force from the spring the weight will flatten an indicator button or weight. However, the need still exists for a low-cost, easily installed and foolproof indicator of impact. The devices described above employ excessive parts to achieve the desired results and become expensive and costly to install.

SUMMARY OF THE INVENTION

This invention relates to a mechanical accelerometer utilizing a weight or mass which will shift when subjected to high acceleration and which has means for providing a visual indication that the acceleration has exceeded a predetermined limit. The device provided for an accelerometer that can be reset and reused as desired and will not be damaged or destroyed when it has been used.

An overcenter action spring is utilized to retain a weight in position until the device is subjected to a known impact load at which time the weight will cause the spring to snap over center to its actuated position and a visual indication of this movement is achieved through a view window in the recorder. Electrical contacts for signal indication can be connected so that upon actuation of the weight and snap-action spring, the time of impact is recorded electrically, or a remote signal can be utilized for signalling the impact audibly or on a recorder.

The weight is of a particular shape so that it bears against the snap-action spring to give more repeatable and accurate tripping of the spring.

The unit is small in size, easy to manufacture, accurate and dependable. The device can be used by applying it to packages containing delicate instruments such as computers, or directly on the instruments to indicate if the instrument has experienced a damaging shock load.

BRIEF DESCRIPTION OF THE DRAWINGS

FIG. 5 is a sectional view taken substantially on the same line as FIG. 4 showing a modified form of the invention having electrical switch actuators at the rear portion thereof;

FIG. 6 is a perspective view of a modified form of the present invention with parts broken away; and FIG. 7 is a sectional view of the device of FIG. 6 showing it in actuated position.

DESCRIPTION OF THE PREFERRED EMBODIMENTS

Figure 1:
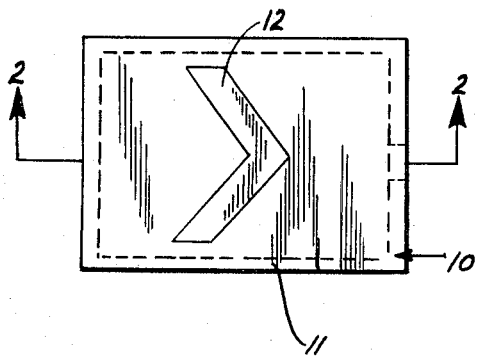
FIG. 1 is a top plan view of an impact indicator made according to the present invention.

An acceleration or impact-sensing unit illustrated generally at 10 comprises an outer case 11 having a top wall with window 12 defined therein. The window 12 is arrow-shaped. The window lets you view the devices on the interior of the casing. The housing 11 has a rectangularly shaped interior opening 13 defined by top and bottom walls and end and sidewalls to form the chamber. A weight member 14 is slidably mounted inside the chamber 13, and is of size so that it clears the sidewalls of the chamber and also the top wall of the chamber when it is resting on the bottom wall. The weight is held against an end wall 15 in its initial position through the use of a flat, overcenter snap leaf spring 16. The spring 16 is mounted in notches 17, 17 on opposite sidewalls of the unit and as shown in its first unactuated position bows toward the end wall 15 with the weight 14 resting against the side of the spring near its midsection and against the end wall 15. Note that the spring length is greater than the width between the ends of the notches 17. A visual arrow indicator plate 20, which is a thin piece of sheet metal, is slidably positioned on top of the weight 14 and has a bent down tab 21 that folds over the midsection of the spring 16. The end wall 22 opposite from the end wall 15 has a pair of stop members 23 thereon which extend toward the spring 16 and are shaped to prevent excessive movement of the spring 16 and weight 14 in direction toward the wall 22. An opening 24 is provided in the end wall 22, and can be used for resetting as will be more fully explained. The entire case can be attached to an object through the use of a layer of double-sided adhesive tape indicated at 28, which has adhesives on both sides, and merely by peeling off the conventional protective strip from the adhesive tape on the exposed surface, the entire case 10 can be positioned onto a box or other unit which is to be monitored. This tape is commercially available and will hold the unit in place under an acceleration of 250 g's. the weight can be made of metal or other suitable material.

Figure 4:
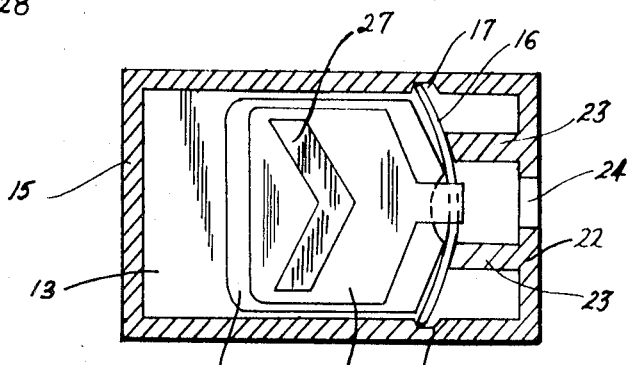
FIG. 4 is a sectional view taken on the same line as FIG. 3 but showing the impact indicator after it has been actuated.

The weight 14 is completely free of the spring except it has a pair of spaced-apart contact points 25,25 near the center of the spring. These contact points are made so that the spring will bend in a predicable and repeatable shape to give accurate results. The weight is of size so that it will slide in the case without twisting or binding, and when an impact force is encountered by the casing 10 (or the container to which it is attached) tending to move the weight in direction as indicated by arrow 26, if the acceleration force from the weight acting against the action of the spring 16 is great enough, this force will cause the spring 16 to go overcenter (bow the other way) and the weight will go to position as shown in FIG. 4. The spring 16 has to deform to go overcenter because it is longer than the width between the ends of the notches 17. However, the spring is designed to do this, and once it has gone overcenter it will remain in this position to which it moved. The stops 23 prevent the weight 14 from going too far and causing the spring to slip out of its notches 17. Now, in the actuated position, a brightly painted arrow-shaped strip 27, which is on the top surface of the indicator plate 20, will be visible through the window 12. The window can have a transparent covering or can be completely open as desired. The arrow-shaped strip 27 is a brilliant color such as a fluorescent orange that is highly visible against the normal dark color of the exterior of the case so that as soon as the color appears in the window 12 it is known that the unit has been accelerated beyond its design point and that the container has been subjected to an impact that is at least equal to the design loading.

As can be seen in FIG. 4, the indicator plate 20 will stay in position so that the arrow 27 is visible in window 12 because the tab 21 will keep it in place. The weight can slide with respect to the plate. The spring has a snap action so it remains in place until reset with external force. If it is desired to reuse the impact indicator, a rod can be inserted in through the opening 24 and reset the spring 16 so that it is in its first position and the weight is pushed back against the wall 15. The unit can then be used again.

Figure 3:
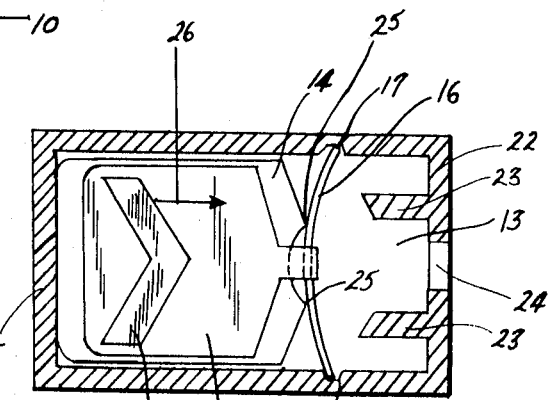
FIG. 3 is a sectional view taken as in line 3—3 in FIG. 2.
Figure 2:
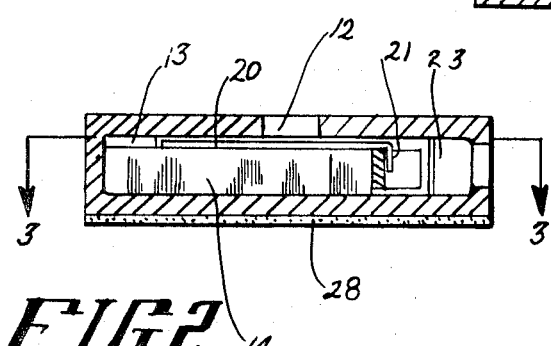
FIG. 2 is a sectional view taken as in line 2—2 in FIG. 1.

The portion of the indicator plate 20 surrounding the arrow-shaped portion 27 would be colored the same as the case so that when the unit is in its operative position as shown in FIG. 3, there would be no color indication in the window 12.

A double directional unit can be made by having two leaf springs 16, one acting on each end of a centrally located weight and having two viewing windows 12 so that if the weight moves in either direction, an indicating arrow would be visible in one of the windows. The spring would act in exactly the same way as shown at each end of the case. Likewise, the cases or housings 10 can be arranged in as many directions as desired to provide indication in all directions of force if desired.

It also should be pointed out that the hole 24 can be closed up if a tamper-proof device is desired.

The specially designed spring contact points 25 of the weight 14 are made to give move repeatable snap action to the spring. If the weight bears only in the center of the spring, the theoretical deflection of the spring would be symmetrical but because of the variations that occur in thickness, size and material of the spring, the bending shape of the spring as it goes overcenter occurs randomly and is usually in an unsymmetrical shape which means that it is not very reliable or repeatable. When two contact points with the bowed spring 16 are used, the bending shape of the spring as it goes overcenter is more symmetrical because there are two points of application to force and thus the force necessary to snap the spring becomes more predictable and repeatable. Bearing points that are ideally located bear at points from 8 to 16 percent of the spring span measured from the centerline or bisecting place of the spring to the ends of the spring. In other words, each of the bearing points is between 8 to 16 percent of the distance from the centerline of the case to the outer bearing end of the spring. When two contact points are used like this, repeatability is better. The spring actually wrinkles or buckles as it goes overcenter.

A modification of the present invention is shown in FIG. 5. The construction is exactly the same, the weight, the display arrow and the like, and the same numbers are used in this situation. However, the outer case 30 is modified and has a set of contacts illustrated at 31 mounted on the interior thereof. The contacts 31 are positioned on the interior of the case 30 adjacent an end wall 32 and electrical wires 33 and 34 are connected to the contact members 35 and 36, respectively. When the unit is actuated, as shown in dotted lines, the contact member 35 will be forced against contact member 36 and will cause completion of an electric circuit between the wires 33 and 34 to permit control of an electric circuit such as an indicating alarm, a timer circuit, a clock or the like. This electrical indication can be used to give a desired signal to aid in finding out the cause of the impact. (It can establish time of occurrence or the like). The weight operates in exactly the same way, but the case would not need an indicator window if an electrical signal is being utilized.

FIG. 6 and 7 show a modified form of the invention which is adapted for mounting into a threaded opening. Here an outer case 40 as shown has a hex-shaped upper end and a threaded lower portion 41. An interior chamber 42 is defined inside the housing and a weight or mass 43 is slidably mounted in this chamber. The interior chamber can be circular in cross section if desired. The weight is used here to actuate a spring member 44, and the spring member can be of a 3-legged shape as shown in FIG. 6 or any other preferred shape. The outer ends of the legs will rest in a provided groove 45 defined in the interior wall of the housing.

An indicator button 46 is also attached to the spring in the center portion and extends slidably through an opening 47 in the top wall of the housing. When the spring is set in its dotted position as shown on FIG. 7 the weight would be back down against a wall 48. Upon receiving an impact in direction indicated by arrow 49, the weight would act against the spring 44 through a pair of contact points 50, 50 and cause the spring to go over center to its solid line position causing the indicator button 46 to protrude out beyond the surface of the end wall 51 of the indicator. This would show that the impact had occurred and that the device had been actuated. The weight 43 could actually go back and rest against the wall 48 after the impact and the indicator would still remain in its actuated position, protruding out through the wall. However, as drawn in FIG. 7 the weight 43 is up against the spring in its actuated position.

This type of indicator can be threaded readily into openings for bolts or set screws so that the sensing of impacts on machinery can easily be made. This unit can be reset merely by pushing the indicator rod or button 46 back downwardly to its retracted position. Once the button 46 is extending beyond the outer wall 51 it is known that the impact exceeding the design rating of the unit has been experienced. The button or indicator 46 can be brightly colored if desired. Electrical switch contacts can be used with this type of construction for an electrical signal indication of excessive acceleration forces or impacts.

In all of the designs, there are are really two factors which relate to the rating of the impact indicator. One is the spring. The stiffer the spring the higher the trigger point acceleration level, or the higher the rating of the unit. The other factor is the weight or mass acting on the spring. The lighter the weight, again, the higher the trigger point acceleration level. The spring can be made stiffer by additional thickness, or by shorter length or by a change in shape or a change in end support means. The weight can be changed by changing the density of the material or adjusting the volume of the material or any combination of this. The weight, of course, responds in a well-known manner to acceleration forces. The adhesive-backed material has been found to be satisfactory for applying the units to most installations. The weight and case will be selected so that their coefficient of thermal expansion will be nearly identical to minimize any temperature effect and the spring, of course, will be selected to have low hysteresis and offset errors and will be the type of material that can be highly stressed at its snap point. A hard stainless steel spring has been found to be satisfactory.

What is claimed is:

1. Means for measuring mechanical acceleration including a housing having spaced walls, mass means in said housing mounted for movement with respect thereto, said mass means comprising a weight member, leaf-type spring means movable between first and second position, means mounting outer ends of said spring means between walls of said housing comprising supports spaced a lesser distance apart than the length of said spring means to bow said spring means with respect to a reference line passing through the supported ends of said spring means, said leaf spring means being deflectable from a first position on one side of said reference line joining said ends, to a second position on the opposite side of said reference line joining said ends, said spring means being movable to said second position under influence of said weight member, said weight member being separate from said spring means and including spaced-apart projections bearing on said spring means to actuate said spring means from its first position to its second position under influence of an acceleration force on said weight member, and means to indicate when said spring means is in its second position.

2. The combination as specified in claim 1 and electrical contact means actuated by said spring when said mass moves said spring to said second position.

3. The combination as specified in claim 1 wherein said indicating means comprises an indicator button member attached to said spring means said indicator button being visible on the exterior of said housing when said spring means is in said second position and not substantially protruding from said housing when said spring means is in its first position.

4. The combination as specified in claim 1 and means on said housing comprising an opening to provide access to permit manually moving said spring means from its second position back to its first position.

5. The combination as specified in claim 1 wherein said indicator means comprises a window in one wall of said housing, and a display indicia movable with said spring means to indicate when said spring means moves to its second position.

6. The combination as specified in claim 1 wherein the projections of the weight member bear on said spring on opposite sides of a bisecting plane through the spring and each projection bearing on the spring at a distance measured from the bisecting plane to the bearing points substantial 8 to 16 percent of the distance from the bisecting plane to the ends of the spring.

7. The combination of claim 1 and stop means in said case to engage said spring when said spring has moved to said second position.

* * * * *